No. 666,826. Patented Jan. 29, 1901.
H. G. UNDERWOOD.
POWER SYSTEM EMPLOYING EXPLOSIVE ENGINES.
(Application filed Dec. 14, 1899.)
(No Model.) 2 Sheets—Sheet 1.
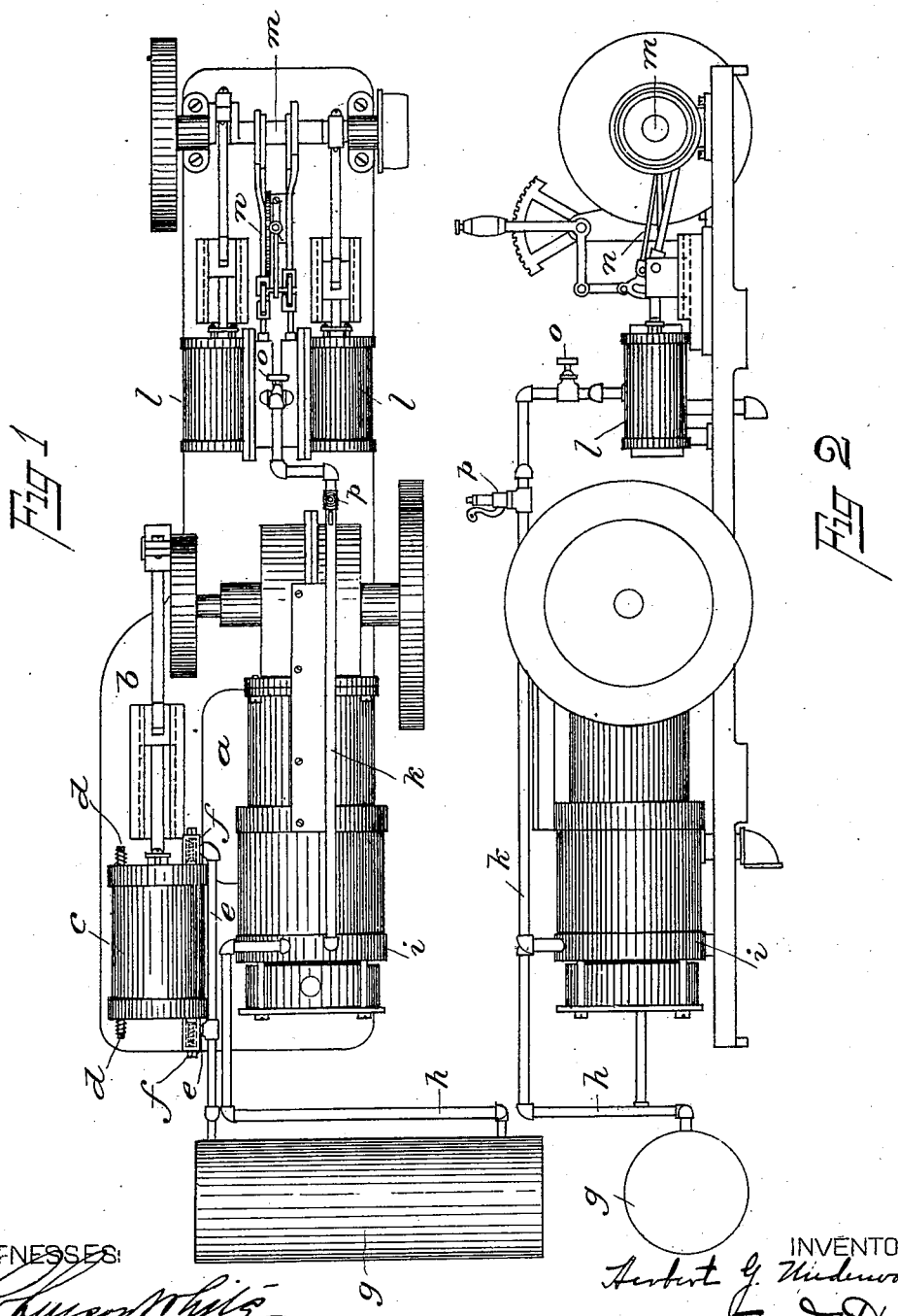
WITNESSES:
INVENTOR
Herbert G. Underwood
BY
ATTORNEY.

No. 666,826. Patented Jan. 29, 1901.
H. G. UNDERWOOD.
POWER SYSTEM EMPLOYING EXPLOSIVE ENGINES.
(Application filed Dec. 14, 1899.)
(No Model.) 2 Sheets—Sheet 2.
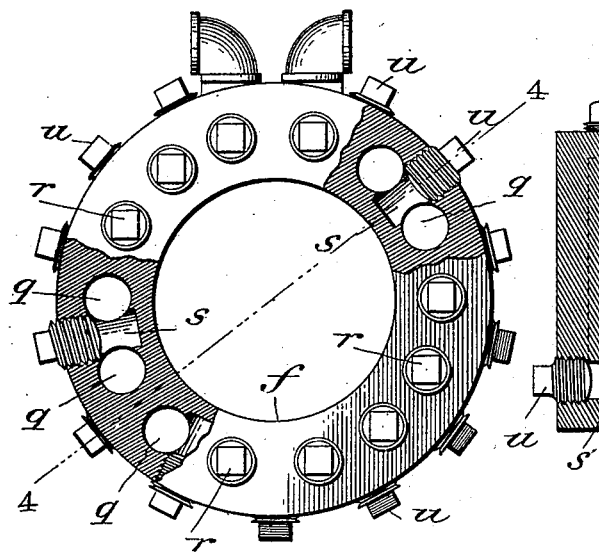
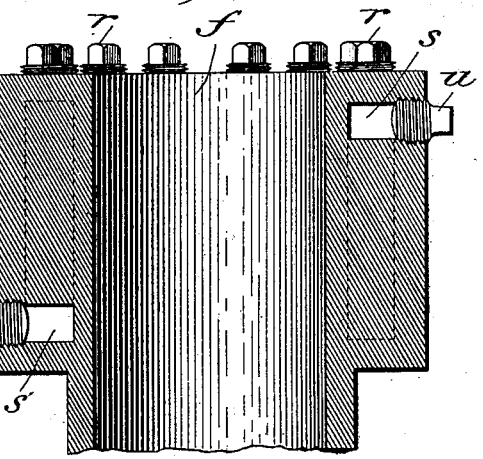
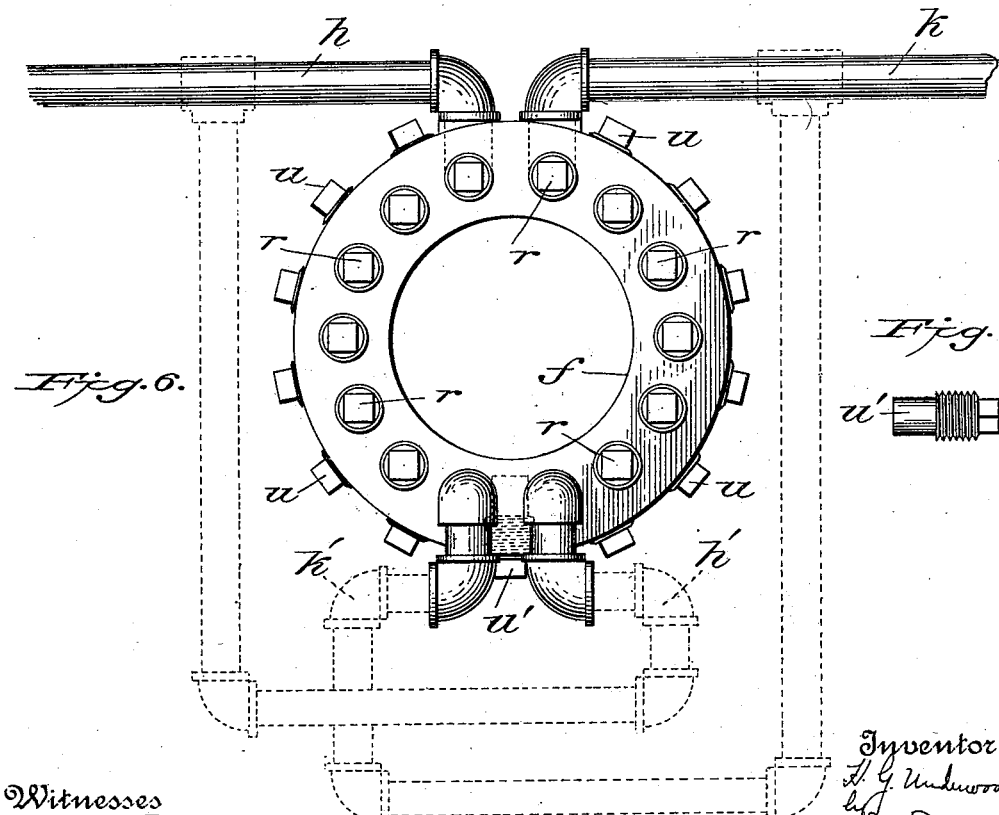
Witnesses
G. S. Elliott.
John Byng
Inventor
H. G. Underwood
by
Attorney

United States Patent Office.

HERBERT GEORGE UNDERWOOD, OF NEW YORK, N. Y., ASSIGNOR, BY DIRECT AND MESNE ASSIGNMENTS, TO THE INTERNATIONAL POWER VEHICLE COMPANY, OF WEST VIRGINIA.

POWER SYSTEM EMPLOYING EXPLOSIVE-ENGINES.

SPECIFICATION forming part of Letters Patent No. 666,826, dated January 29, 1901.

Application filed December 14, 1899. Serial No. 740,325. (No model.)

*To all whom it may concern:*

Be it known that I, HERBERT GEORGE UNDERWOOD, a citizen of the United States, residing in the borough of Manhattan, in the city, county, and State of New York, have invented a certain new and useful Power System, of which the following is a specification.

Speaking generally, this invention relates to a system in which heat generated in a motor, but not otherwise used in the production of power, is employed to heat compressed air, thereby placing it under increased pressure or increasing its volume, and in which the heated compressed air is used as the propelling means of a suitable motor.

As is well known, many types of motive apparatus while not dependent upon heat for their operation generate it in greater or less quantities, while other forms of motive apparatus while dependent upon heat for their energy produce it in larger quantities than can be absorbed in the production of power in the manner they are now constructed. An ordinary explosive-engine is an example of a motor of the second class. In such an engine fuel is consumed, a part of the heat produced thereby being utilized to expand the products of combustion to produce motion in the piston (or equivalent part of the engine) and a part being imparted to the engine structure. Heretofore only the first of the two parts above specified has in general practice been utilized for generating motive power, various devices having been used for dissipating and carrying away the heat imparted to the engine structure, which would otherwise become so hot as to destroy itself. It is also well known that explosive-engines are difficult to start and reverse or to control; and a further object of my invention is to apply the mechanical power generated in such engines to the production of power through the medium of air compressed thereby and heated by the otherwise waste heat of the engine before being led to a suitable motor to energize it, the last-named motor being stopped, controlled, or reversed by a corresponding variation in the amount of heated compressed air supplied thereto and by varying the direction in which the air is supplied, as is well known in connection with the various types of air-motors, and this without varying the speed or direction in which the explosive-engine is driven, so that an explosive-engine may be employed during periods when no or a reduced amount of the compressed air is being used in the production of power to store up power by compressing air to be employed in driving the air-motor when started, thereby adapting an explosive-engine to the driving of any machinery which it is necessary to control in speed, as well as to frequently stop and reverse. As an example of such machinery I may cite, without restricting my invention to use therewith, motor-vehicles. It is obvious that the heated compressed air may be employed to drive suitable motors adapted to propel such structures. To accomplish these various objects, my invention consists in constructing a cylinder of an explosive-engine with air-heating passages in the walls thereof, all or a part of the said passages being connected in series, and in means whereby the several passages may be disconnected from each other and connected up to the compressed-air supply and air-motor in various relations to each other; in a relief-valve adapted to discharge the compressed air upon an undue increase in the pressure thereof through the air-heater formed by the passages in the walls of the engine-cylinder, so that a stoppage of the flow of air to the air-motor when the latter is not in use shall not result in an overheating of the engine-cylinder, and in the construction, arrangement, and combination of the several parts of which it is composed, as will be hereinafter more fully described and claimed.

Referring to the particular embodiment of my invention shown in the accompanying drawings, in which corresponding parts are designated by corresponding marks of reference, Figure 1 is a plan view of mechanism embodying my invention shown as applied to an explosive-engine. Fig. 2 is a side elevation thereof. Fig. 3 is an end elevation of the cylinder of the explosive-engine, parts thereof being broken away for the purpose of better illustration. Fig. 4 is a longitudinal section on the line 4 4 of Fig. 3. Fig. 5 is a detail view of a plug adapted to close the port between two air-passages. Fig. 6 is a view similar to Fig. 4, but with the passages divided into two series, the air-pipe connections being shown in dotted lines.

The explosive-engine $a$ may be of any suitable type (although preferably of the general character described in my other application, hereinbefore referred to) and needs no further description. It drives by suitable connections the piston $b$ of an air-compressor $c$, provided with proper inlet-valves $d$ $d$ and outlet-pipes $e$, the latter being provided with check-valves $f$ therein. From the air-compressor the air is led by the pipes $e$ into a pressure tank or reservoir $g$ and thence by pipe $h$ through or in proximity to the walls of the cylinder $i$ of the explosive-engine, where it is heated, the heated air being led by the pipe $k$ to a suitable device for utilizing the energy due to its pressure. In the drawings this device consists of a pair of air-engines $l$, coupled to a shaft $m$, from which power may be transmitted in any approved manner. The engines $l$ are provided with a link-motion $n$, and a throttle $o$ is inserted in the pipe $k$. A suitable relief-valve $p$ is provided for discharging air from the system when the pressure passes a predetermined limit, and, as shown, I place the relief-valve in the pipe $k$, between the air-heating device and the air-engine, so that the air compressed by the air-pump before it can escape from the system must pass through the air-heating chamber, the relief-valve thus relieving the reservoir through the air-heating chamber.

In Figs. 3 and 4 I have shown an effective construction for heating the air. As shown therein, passages $q$ are formed in the walls of the cylinder $f$ from the end thereof, the ends of the passages being closed by screw-plugs $r$. The passages are connected together by ports $s$, which are arranged staggered in their relation to each other, and one of the passages is connected to the air-inlet pipe $h$ and the passage adjacent thereto is connected to the outlet-pipe $k$, there being no connection between the two said passages except through the total length of the passages, so that in passing therethrough the air will be highly heated. Indeed, under some circumstances the air may be so highly heated when passing through all the passages in series that it will not be able to properly cool the walls of the cylinder, especially near its point of outflow therefrom. For this reason, as well as for convenience in construction, I prefer to form the ports $s$ between the passages by drilling or by otherwise forming apertures $t$ in the side of the cylinder between the passages, the inner ends of the apertures connecting with the passages on both sides thereof. The outer ends of such apertures are then closed by short plugs $u$, so that, if desired, any of such plugs may be removed and replaced by a longer plug $u'$, (shown in Fig. 5,) which should be of sufficient length to close the port formed by the aperture in which the plug is inserted. By this means the passages will be divided into two independent and unconnected series, proper additional connections being made by replacing two end plugs $r$ on each side of such longer plug, as shown in Fig. 6, by the air-supply pipe $h'$ and heated-air pipe $k'$, respectively, these pipes being connected, as shown in dotted lines, to the pipes $h$ and $k'$.

In the operation of the system above described air compressed in the air-pump flows through the reservoir and chambered walls of the cylinder $i$ of the explosive-engine. Here it is highly heated, being thereby placed under greater pressure or increased in volume, and while still heated is led to the air-motor, where it generates power. It will be noted that the power thereby exerted at the air-motor is not only that due to the initial compression of the air at the compressor by that portion of the heat of explosion which is utilized in driving the piston of the explosive-engine, but also to that portion of the heat of explosion which was imparted to the walls of the cylinder and which was absorbed by the air in passing therethrough. I thus obtain at the air-motor a large percentage of the power possessed by the fuel consumed in the explosive-engine.

It will be seen that the air-motor may be stopped by closing the cut-off or throttle, and in such case the air-compressor will deliver air as before to the reservoir, building up a reserve of power to be utilized in starting and running the air-motor. As soon as this power is built up to the limit of pressure fixed by the relief-valve the latter lifts and permits the escape of some of the air from the air-tank. If, as before stated to be the preferred construction, the relief-valve is located between the heater formed in walls of the cylinder and the air-motor, the air escaping therethrough will abstract heat from the cylinder, thus maintaining the latter at a uniform temperature even when the air-motor is not running.

Having thus described my invention, what I claim, and desire to secure by Letters Patent, is—

1. The combination with an explosive-engine, and an air-pump driven thereby, of an air-motor driven by the air compressed by the pump, means for imparting heat from the engine-cylinder to the compressed air prior to its admission to the air-motor, and a relief-valve, the means for heating the air being located between the air-pump and the relief-valve, substantially as described.

2. The combination with an explosive-engine, having air-heating and cylinder-cooling passages formed in the walls thereof, of an air-pump forcing air through the said passages, an air-reservoir receiving air from the pump, an air-motor driven by the compressed and heated air and a relief-valve permitting the air compressed by the pump to escape through the air-heating passages, substantially as described.

3. A cylinder for explosive-engines, having a series of air-passages formed in the walls thereof, apertures opening upon the surface of the cylinder and forming connecting-ports between the several passages, and plugs adapted to close the said ports, substantially as described.

4. A cylinder for explosive-engines, having a series of air-passages formed in the walls thereof, apertures connecting the adjacent passages and opening upon the surface of the cylinder, and plugs to close the ends of some of the said apertures and plugs to close the connection between some of the said passages, substantially as described.

5. A cylinder for explosive-engines, having a series of air-passages formed in the walls thereof, and having open ends, plugs for closing the ends of the passages at will, apertures connecting the adjacent passages and opening upon the surface of the cylinder, and plugs to close the ends of some of the said apertures and plugs to close the connection between some of the said passages, substantially as described.

In testimony whereof I have signed my name to this specification in the presence of the subscribing witnesses.

HERBERT GEORGE UNDERWOOD.

In presence of—
   A. G. OLNEY,
   CLARENCE W. HATCH.